United States Patent
Heller

(10) Patent No.: US 6,805,367 B1
(45) Date of Patent: Oct. 19, 2004

(54) WAGON VEHICLE WITH INTERCHANGEABLE INTEGRAL SIDE PANELS

(76) Inventor: John E. Heller, 937 Curran Ave., Kirkwood, MO (US) 63122

( * ) Notice: Subject to any disclaimer, the term of this patent is extended or adjusted under 35 U.S.C. 154(b) by 64 days.

(21) Appl. No.: 10/142,282

(22) Filed: May 9, 2002

Related U.S. Application Data

(60) Provisional application No. 60/290,766, filed on May 14, 2001.

(51) Int. Cl.[7] .................................................. B62M 1/00
(52) U.S. Cl. .................... 280/87.01; 280/1.16; 296/177
(58) Field of Search ............................... 280/1.13, 1.16, 280/47.38, 79.11, 87.01, 87.021, 87.043, 87.051, 143, 147, 656, 657, 658; 296/177; 292/350, 351

(56) References Cited

U.S. PATENT DOCUMENTS

| | | | | |
|---|---|---|---|---|
| 1,213,017 A | * | 1/1917 | Reinert | 280/47.38 |
| 1,845,092 A | * | 2/1932 | Meininghaus | 296/43 |
| D158,044 S | * | 4/1950 | Bowman | D34/13 |
| 2,503,707 A | | 4/1950 | Braman | |
| 2,676,054 A | * | 4/1954 | Pasin | 296/32 |
| 2,775,462 A | * | 12/1956 | Biasell | 280/827 |
| 3,116,935 A | * | 1/1964 | Mitchin et al. | 280/7.1 |
| 4,098,517 A | | 7/1978 | Sortini | |
| 4,585,210 A | * | 4/1986 | Adams | 251/214 |
| 4,930,831 A | * | 6/1990 | Valiga et al. | 269/26 |
| 4,958,843 A | * | 9/1990 | Cole | 280/30 |
| 5,022,666 A | | 6/1991 | Simon | |
| 5,360,222 A | * | 11/1994 | Bro et al. | 280/87.021 |
| 5,669,617 A | * | 9/1997 | Pasin et al. | 280/87.01 |
| 5,785,340 A | * | 7/1998 | Dias | 280/304.1 |
| 5,957,482 A | | 9/1999 | Shorter | |
| 6,032,972 A | | 3/2000 | Dias | |
| 6,139,061 A | | 10/2000 | Lewis | |
| 6,250,652 B1 | * | 6/2001 | Nelson | 280/47.38 |

* cited by examiner

Primary Examiner—Brian L. Johnson
Assistant Examiner—Christopher Bottorff
(74) Attorney, Agent, or Firm—Polster, Lieder, Woodruff & Lucchesi, L.C.

(57) ABSTRACT

A wagon assembly configurable to resemble one of many vehicles or other ornamental objects. The wagon can be arranged with separate integral side panels, temporarily, but securely, fixed to the horizontal bed member of the wagon by removable threaded knobs. The wagon is easily converted from one vehicle style to another by changing the side panels. The wagon, while configured to represent a vehicle, is capable of carrying passenger(s) or articles resting within the body of the wagon.

19 Claims, 7 Drawing Sheets

WAGON VEHICLE WITH INTERCHANGEABLE INTEGRAL SIDE PANELS

CROSS-REFERENCE TO RELATED APPLICATIONS

This application claims priority to provisional patent application Ser. No. 60/290,766, filed May 14, 2001.

BACKGROUND OF THE INVENTION

The invention relates generally to wagon type vehicles and, in particular, to a children's wagon having interchangeable side wall panels to change the assembly by making those sides an integral part of the wagon assembly and providing an ornamental appearance for the wagon while improving stability and safety of the cargo compartment.

A standard children's wagon generally consists of a wagon body having a horizontally disposed surface for supporting a child or cargo and upstanding front, rear and side panels formed around the periphery of this surface. The wagon body is mounted on a chassis which usually includes wheels and a handle for pulling and steering the wagon. In the past, the traditional wagon bodies have been formed of wood, metal, plastic, or combinations thereof. Usually the peripheral walls are a permanent part of the wagon body. Additional wall sections, if added, are attached to the floor or wall through the use of fasteners, glue, welds or friction fit guides. This arrangement provides a more or less permanent configuration of the traditional wagon body.

Generally, in traditional coaster wagons, the side panels have a low profile. If a child is riding in the wagon, the low profile walls can present a risk of falling out of the wagon. Recently, children's wagon bodies have been made from molded plastic, such as from a high-density polyethylene or some similar material, with some designs having higher walls or somewhat deeper cargo compartments. This plastic material may be utilized for forming wagon bodies of strong but lightweight construction. These wagons, as well the traditional coaster wagons, usually have one external design or appearance.

Wagon-type vehicles with decorative mockage or camouflage have been known to the art. However, these mockages and camouflage bodies are not not rigidly or safely attached to the wagon chassis, nor are these bodies an integral part of the wagon body. They are precariously balanced or lightly clipped to the chassis. In those wagon configurations, shifting cargo, or especially a riding child, easily can disconnect the decorative walls from the chassis, rendering the wagon configuration unsafe. Other designs having more or less permanent bodies or side walls, while making the configuration somewhat safer for hauling cargo, be it human or inanimate, provide a device that is difficult or impossible to alter or modify if the user wishes to change the assembly or look or change the capacity of the cargo area.

Improvements in upward wall extensions for wagon bodies are always desirable which would be considered safer by design. It would be advantageous, therefore, to have a wagon that has a body securely, but removeably mounted on a wheeled chassis with a generally deep cargo or passenger compartment. Also, it would be advantageous to have such a wagon in which the walls of the wagon body are interchangeable to allow variation of the configurations or look of the wagon as well as the cargo capacity. It is desirable to have a wagon in which the outward appearance can be changed to that of another vehicle for aesthetic and amusement purposes.

BRIEF DESCRIPTION OF THE INVENTION

Among the objects of the present invention is to provide a wagon that has side panels which are an integral part of the wagon assembly, yet which are removable side panels that can be easily replaced to change the external appearance of the wagon. Another object is to provide such a wagon that is of sturdy construction and safe for hauling human or inanimate cargo.

In accordance with the invention, briefly stated, a children's wagon of the present invention comprises a vehicle that is comprised of a wheeled chassis that supports a wagon body. The wagon body has a floor, front and back walls and opposed side panels that define a cargo or passenger space. The side panels can be easily changed to create a different outward appearance. For example, interchangeable side panels are provided to change the look of the wagon from one type of common vehicle to another type of vehicle, or even animals or bugs, for aesthetic and amusement purposes. Although removable, the side panels are an integral part of the wagon assembly, attached to the wagon in a secure manner providing an entertaining and aesthetically pleasing wagon that is safe for its intended use.

In the preferred embodiment, this convertible wagon vehicle has a cargo or passenger compartment, or wagon body, mounted on a four wheeled chassis. The wagon body consists of a floor with two opposed end walls and two opposed and matching side panels. The side panels are removably attached to the side edges of the floor of the wagon by easy to manipulate, fasteners. In one aspect of the invention, the fasteners include internally threaded inserts mounted in, and extending out of, the edge of the floor. Openings or holes in the side panels fit over the inserts to position the panel in place. A knob, having an externally threaded stem, is threadedly engaged in the insert and tightened until the wall panel is secured. Other, easily manipulated fasteners may be employed. However, the knobs generally are positioned out of reach of a typical child who would occupy the wagon.

Each set of matching side panels is designed to resemble the external appearance of a common vehicle or other object. For example, the side panels can be configured to give the wagon the external appearance of a fire truck, a passenger car, a steam locomotive, a school bus, a boat, a rocket ship or any other vehicle. The panels can be configured to provide the ornamental appearance of an animal, bug or the like. In any event, the conversion from one set of side panels to another is achieved by the removal of the threaded knobs followed by replacement of the side panels. The side panels and the fasteners are configured for fast and simple conversion. The convertible feature of this wagon allows for children, or adults, to choose a side panel set and to convert the wagon assembly to that of a different vehicle or object through the substitution of the side panels.

DESCRIPTION OF THE PREFERRED EMBODIMENT

Figure 1:
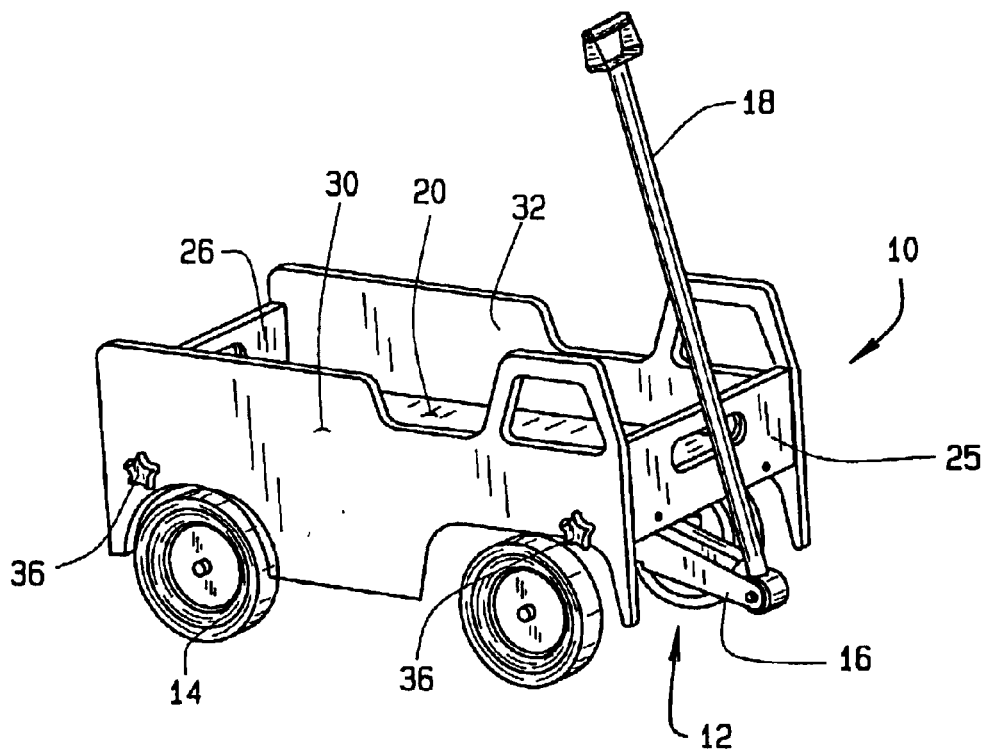
FIG. 1 is a perspective view of the novel wagon assembly of the present invention configured as a fire engine.
Figure 2:
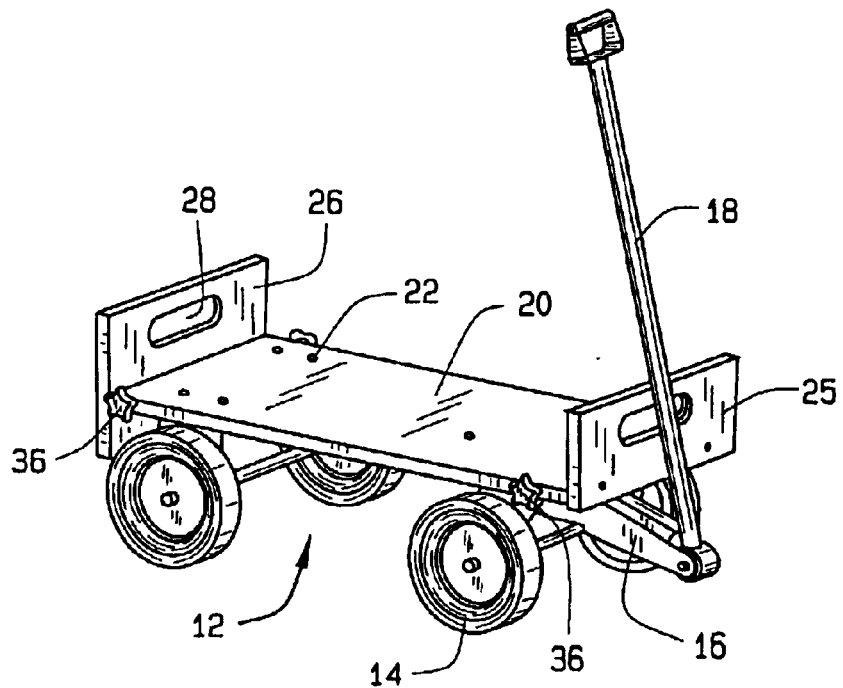
FIG. 2 is a perspective view of the wagon chassis.
Figure 3:
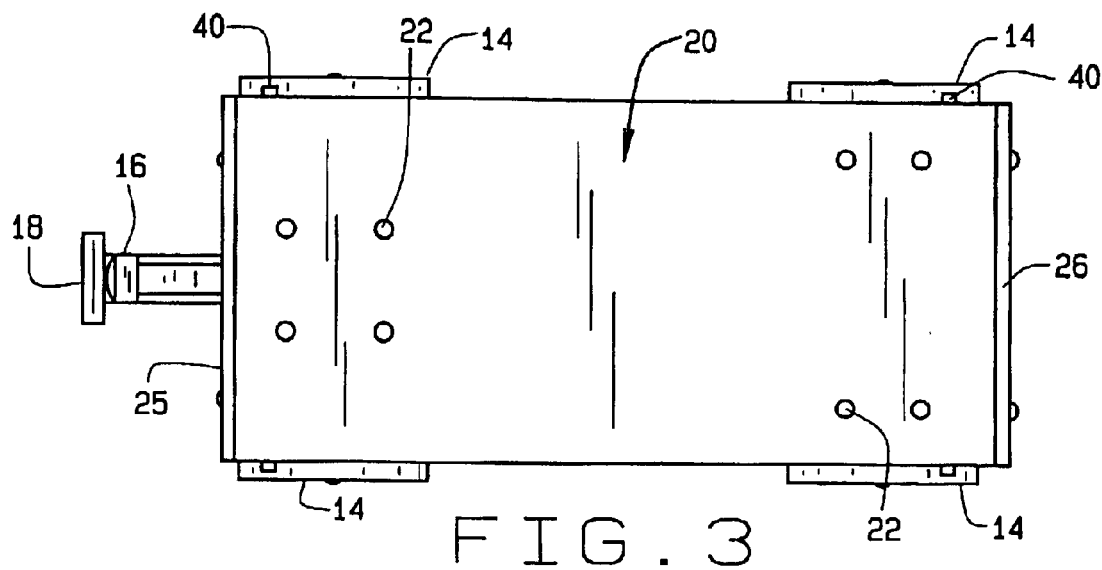
FIG. 3 top plan view of one embodiment of the chassis.
Figure 4:
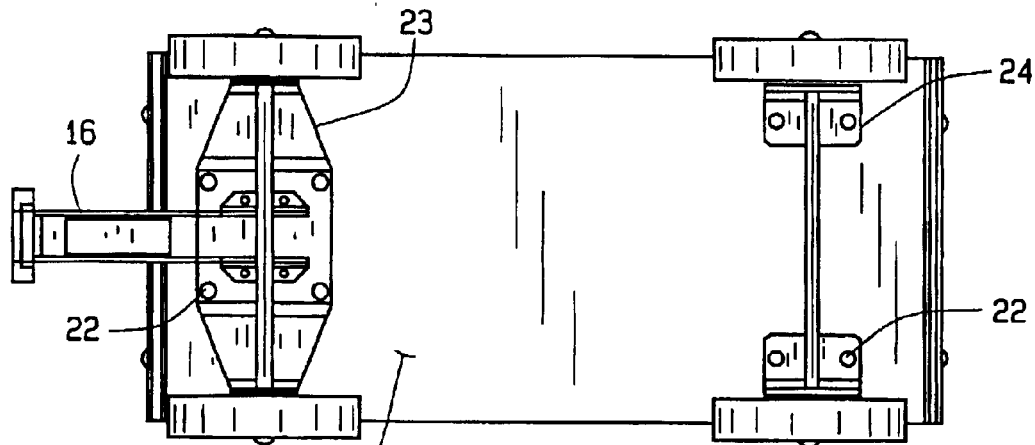
FIG. 4 a bottom plan view thereof.

The convertible wagon of the present invention is indicated generally by reference numeral 10 in the various drawings. The wagon 10 includes a chassis 12, shown in detail in FIG. 2 that has four wheels 14, an articulating tongue 16 and a pull handle 18 for steering. In addition, the handle is designed to be pivoted underneath the wagon. A horizontal base or floor 20 forms the body of the chassis 12. Floor 20 is substantially rectangular and flat having a material thickness defined around its perimeter by a front and rear edge and a first and second side edge. As seen in FIG. 4, a front axle and wheel assembly 23 including the articulating tongue 16 is appropriately attached to the bottom surface of the floor near the front end with attachment means such as nut and bolts 22 or the like. The front axle and wheel assembly is suitably constructed to allow turning and steering of the wagon in use.

A rear axle and wheel assembly 24 is attached to the bottom surface of the floor near the rear end. A front panel 25 is attached to the front edge of the floor and a rear panel 26 is attached to the rear edge of the floor. These respective panels include a handhold 28 formed therein. Of course, any type of handle or ancillary gripping apparatus can be attached to or formed in either the front or rear panels or both. Although shown as rectangles, the front and rear panels can have an ornamental appearance if desired.

Figure 9:
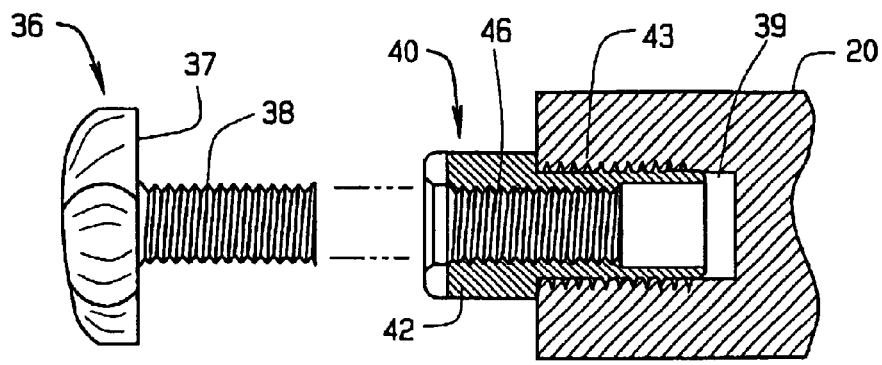
FIG. 9 is a detailed view of a fastener insert mounted in the edge of the chassis floor with the fastener knob positioned for introduction.
Figure 8:
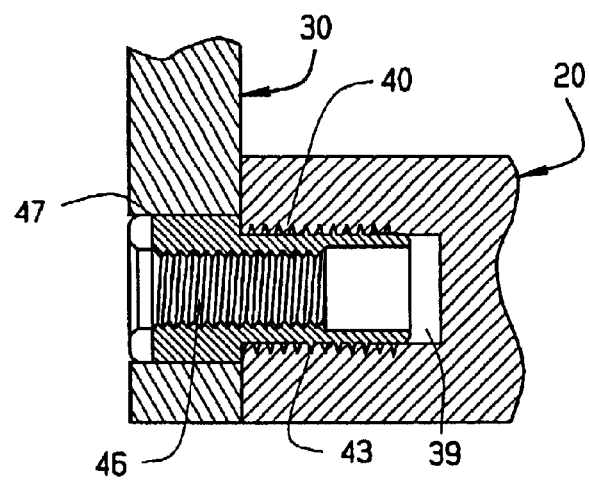
FIG. 8 is a detailed view of a fastener insert mounted in the edge of the chassis floor with a section of side panel positioned on the insert.
Figure 10:
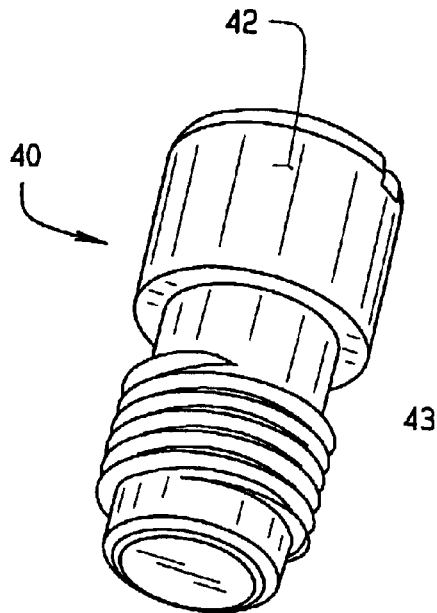
FIG. 10 is an enlarged perspective view of the fastener insert.
Figure 11:
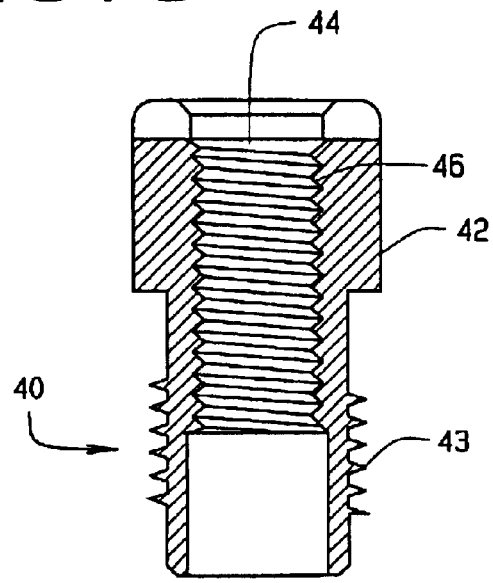
FIG. 11 is an enlarged cross-sectional view of the fastener insert.

Each wagon 10 includes a pair of opposed side panels 30 and 32. The side panels are attached to the side edges of the floor 20 by fasteners, in the illustrated embodiment, threaded knobs and inserts, shown in detail in FIGS. 9 through 11. The various panels and floor provide a cargo space for hauling or a passenger area for a child seated on floor 20. Knob 36 has a handle 37 an externally threaded stem 38. One each of the knob and insert fastener assemblies is positioned at each end of the side panels. It will be noted from the drawings that the knob and insert fastener is positioned relatively low on the side panel, making the knob extremely difficult, or nearly impossible for a child seated in the passenger area of wagon to reach.

The side edges of the floor 20 have bores 39 formed therein. Metallic inserts 40 are inserted into the bores 39 in the edge of the base 20. The inserts have forward lug 42 and an externally threaded shaft 43. The threaded shaft facilitates introduction of the insert in the bore and also functions to anchor the insert in the material thickness of the base. As shown, the insert includes an internal bore 44. Bore 44 has an internally threaded section 46. The inserts 40 extend outwardly from the plane of the edge of the base 20 so that holes 47 formed in the side panels can slide over the lug portion of the inserts to position and support the side panels during installation. The threaded stem 38 is inserted through the holes 47, rotated and tightened in the inserts to secure the side panels in place against the base 20. This advantage is best seen in FIGS. 15A and B.

Figure 15A:
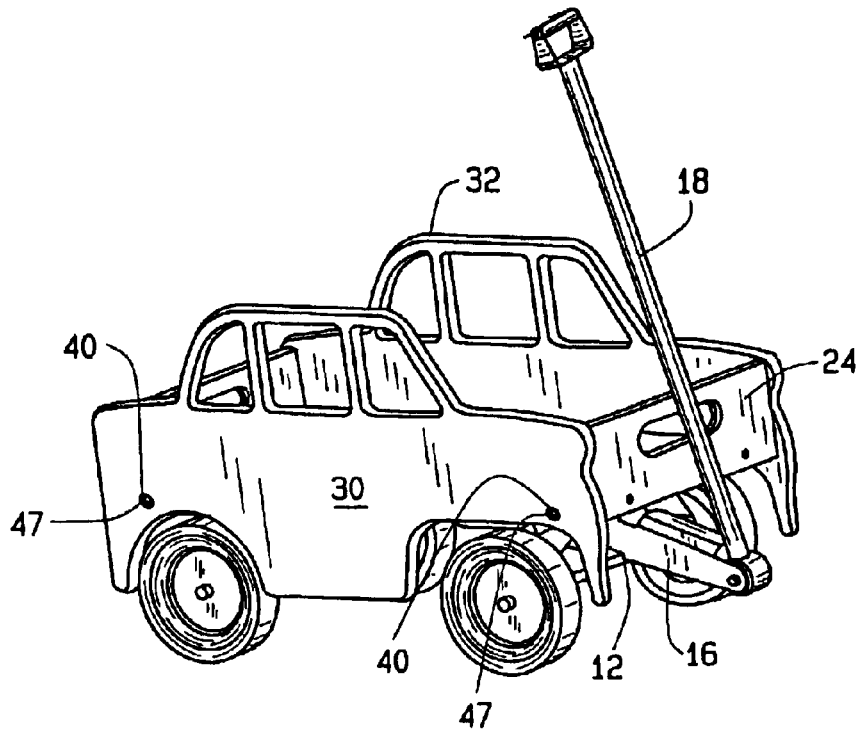
FIG. 15A is a perspective view of the novel convertible wagon with taxicab side panels, the panel mounted on the insert lugs prior to introduction of the knob.
Figure 15B:
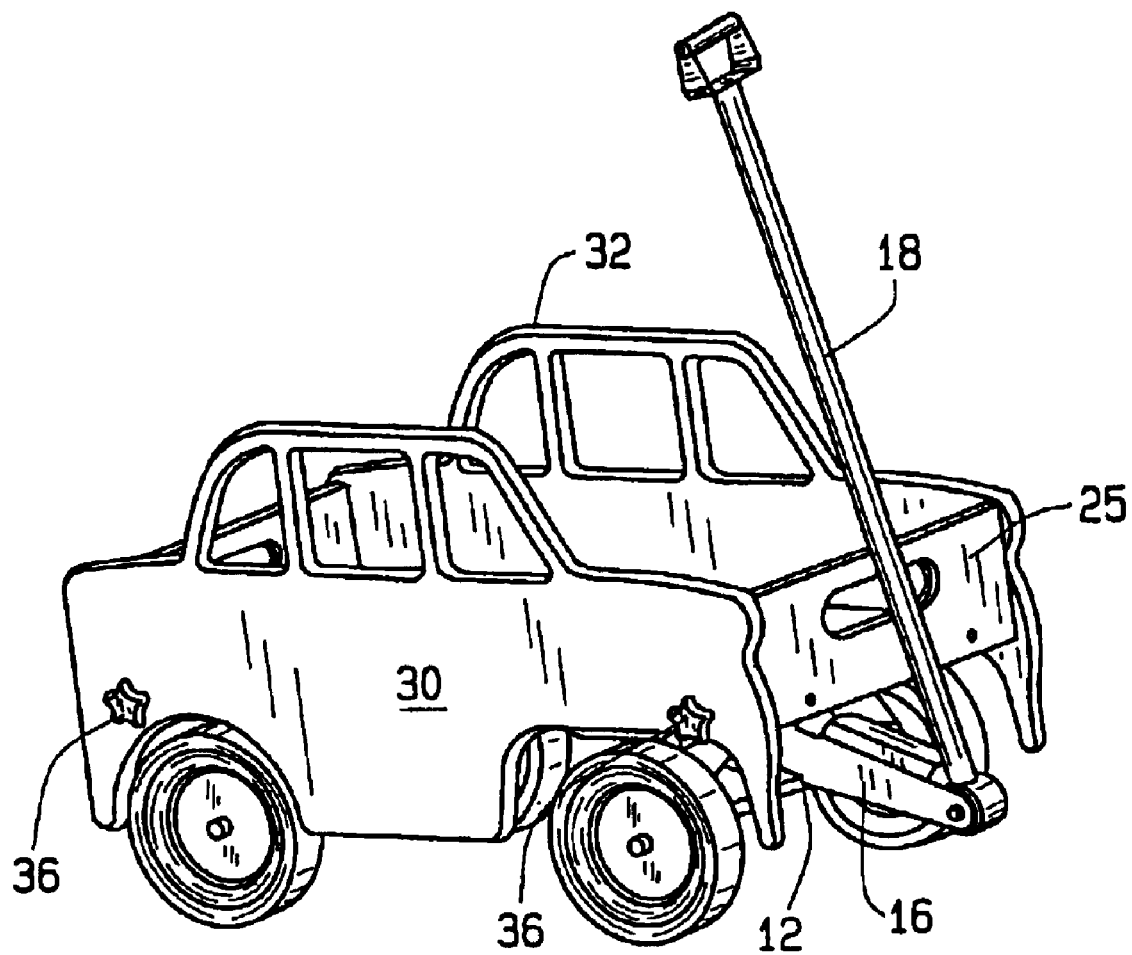
FIG. 15B is a perspective view of the novel convertible wagon with taxicab side panels, the panel mounted on the insert lugs after introduction of the knob.

In FIG. 15A the side panel is positioned so that the lugs extend through holes 47 in the side panel. The panel can rest on the lugs until the threaded stem of the knob 36 is tightened in the insert to impinge the panel between the knob and the base.

Figure 5:
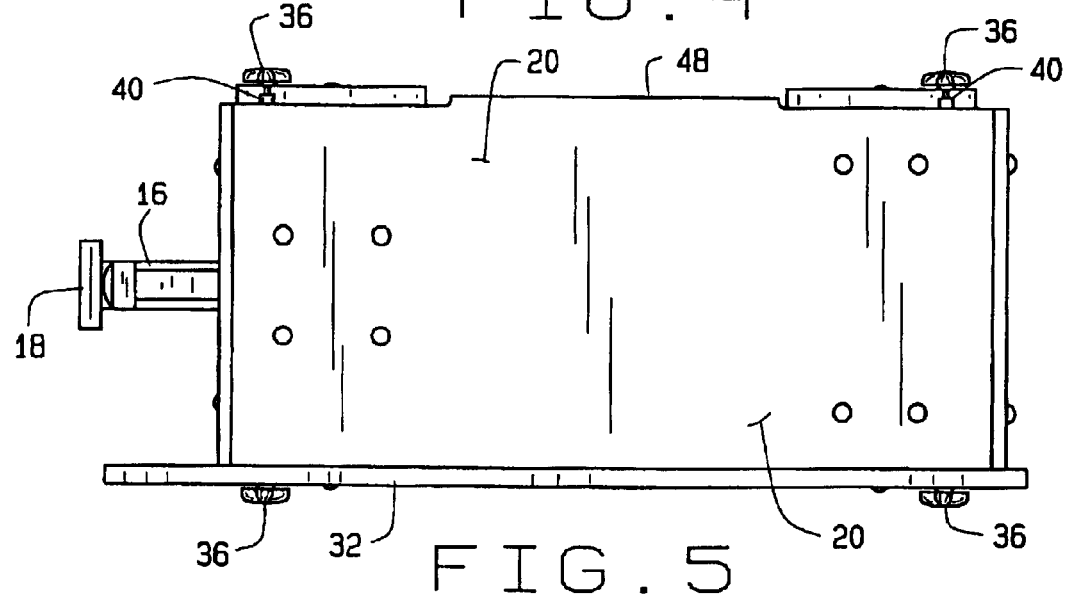
FIG. 5 is a top plan view of another embodiment of the chassis.
Figure 6:
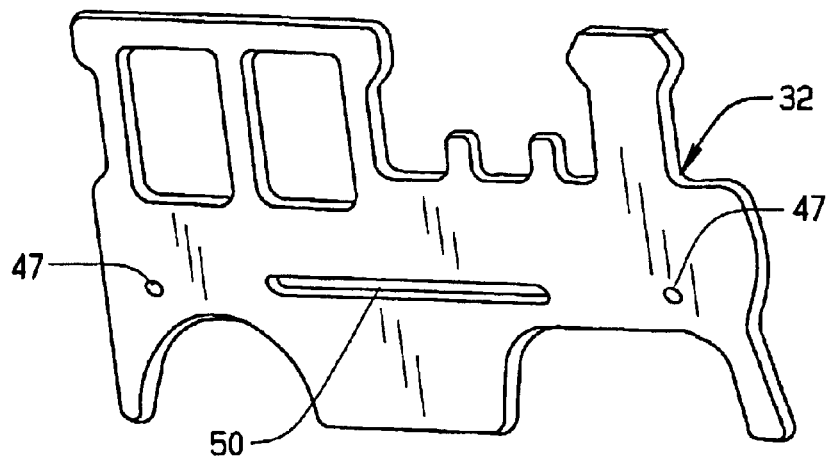
FIG. 6 is a perspective view of one embodiment of a side panel.
Figure 7:
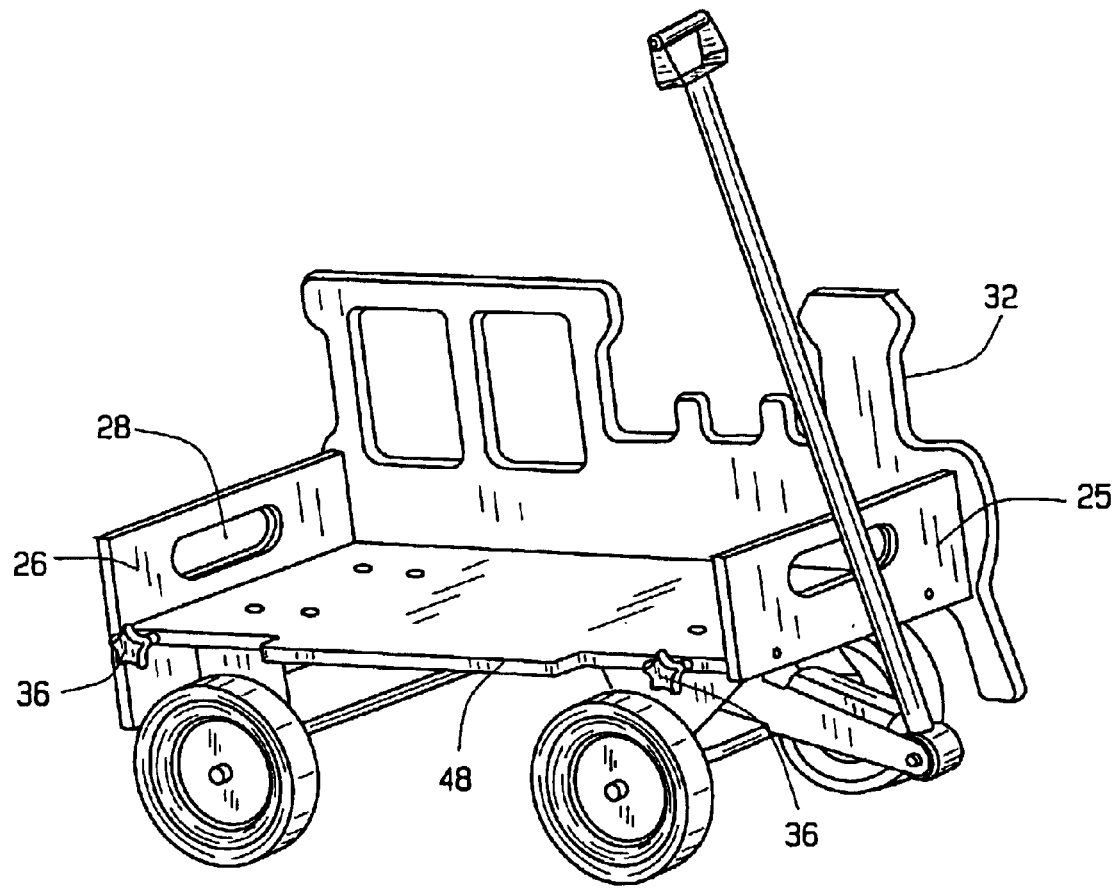
FIG. 7 is a perspective view of the chassis of FIG. 5 with the side panel of FIG. 6 mounted thereon.

This arrangement allows one person to easily align and mount the side panel. In another embodiment, shown in FIGS. 5 through 7, each side of floor 20 has a tongue 48 that extends outward and along the center section of the edge of the floor. The side panel has a groove 50 formed therein an appropriately positioned so that tongue 48 engages groove 50. The knobs are tightened into the inserts. The tongue and groove arrangement positions and secures the panel in place and increases the rigidity and safety of the assembled wagon.

Each side panel easily can be changed by rotating and removing the knobs 36, removing the side panel, and attaching a new side panel to the floor. Although the fasteners of the illustrated embodiment may be preferred, any acceptable fastener apparatus, which readily allows convenient replacement of the wall panels, is included within the scope of the invention. Other examples of acceptable fasteners include over-center draw latches with the latch attached to the body of the wagon (for example, two on each end) and a clip on the ends of the side panels; rubber pull latches, with the rubber latch attached to the body of the wagon (for example, two on each end) and a clip on the ends of the side panels; threaded stud and nut, with threaded studs mounted in the wagon chassis to receive a nut to hold on the side panel; dovetail arrangement, wherein the chassis incorporates a dovetail (male or female) and the side panel incorporates the opposite male or female design to mate with the chassis; slide and lock mechanisms, wherein a slide plate slides into position using a spring device requiring depression of the sprung device for removal; captive fastener, where a captive fastener is incorporated into the side panels and the mating insert is mounted in the chassis; a vlier pin apparatus where a side plate is located and attached via a sprung pin (vlier pin) with the vlier pin located on the side panel and a mating hole located on the chassis; or combinations thereof. One attribute of the fasteners of the present invention is that they are easily manipulated by someone outside the wagon, but not easily manipulated from within the wagon, adding to the safety of the assembly when a child is riding inside. Further, the fasteners of the present invention attach the wall panels to the chassis in such a manner as to be considered integral to the wagon when attached.

Figure 12:
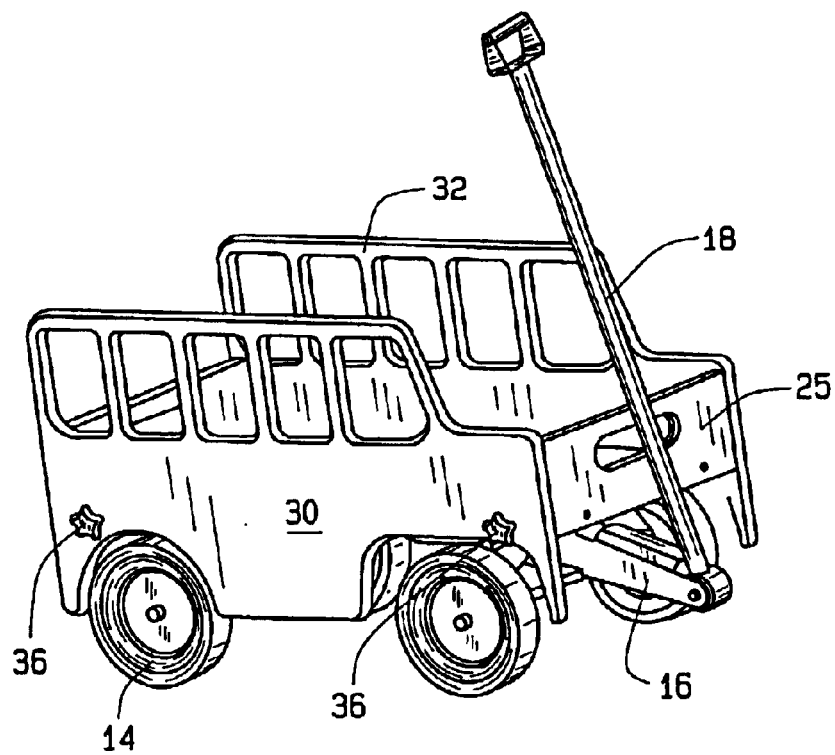
FIG. 12 is a perspective view of the novel convertible wagon of the present invention configured as a school bus.
Figure 13:
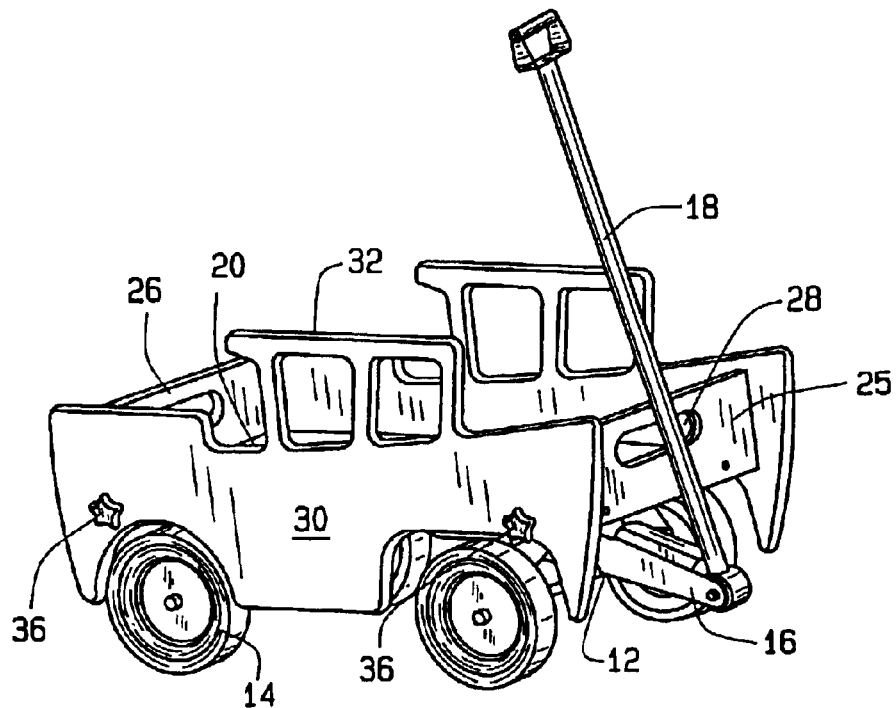
FIG. 13 is a perspective view of the novel convertible wagon configured as an Alaskan fishing boat.
Figure 14:
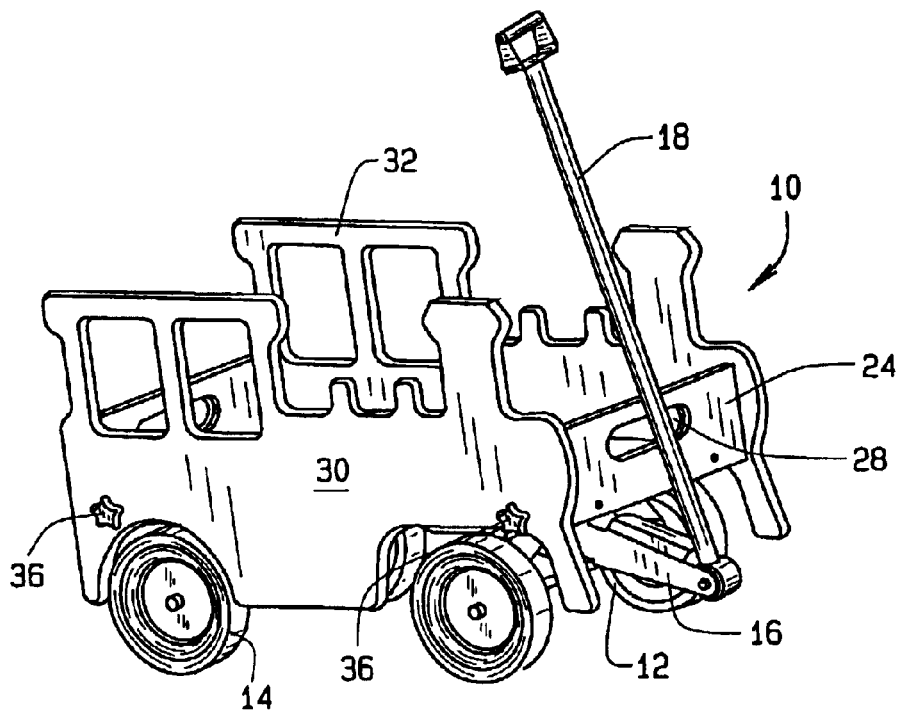
FIG. 14 is a perspective view of the novel convertible wagon configured as locomotive engine.

FIGS. 12 through 15 illustrate the diversity of the novel design. In FIG. 12, the side panels 30 and 32 are configured as a school bus. The wagon in FIG. 13 has side panels configured to resemble an Alaskan fishing boat. FIG. 14 illustrates a wagon with side panels configured to look like a locomotive engine and FIG. 15A and B is configured as a taxicab. FIGS. 12 through 15B are intended to demonstrate the versatility of the wagon and should not be construed as limiting.

As can be appreciated by the reference numerals, the same basic components can be employed in the different configurations. The side panels can be configured to resemble any type of vehicle, such as boats, airplanes, other trucks and automobiles. The decorative side panels can be made of any acceptable material including wood, plastic, metal or the like. Furthermore, although shown in the figures as vehicles such as cars, trucks and boats, it will be understood that other panels can be used, such as airplanes, rocket ships, or living organisms such as fish, any warm-blooded animal, reptiles or insects without departing from the scope of the invention.

The upwardly extending side panels, in addition to being decorative, provide a deep, and unobstructed, passenger compartment, often beneficial when used by small children. This feature, in combination with the removable side panels, provides a very compact unit that is desirable, for example, when one wishes to transport the wagon in the trunk of a car.

The unique attributes of the wagon, of the present invention, accomplish a number of objectives. Specifically, the separate yet integral side panels allow for the wagon easily to be converted at will from one vehicle type to another. In addition, the geometry provided by the side panels affords a deep passenger compartment. Further, removable fasteners secure the panels to the floor improving the safety aspects of the wagon yet allow for the side panels to be removed quickly and easily. The simple conversion also allows the wagon to be transported and stored more efficiently.

What is claimed is:

1. A wagon assembly comprising:
   a chassis having a planar base with a first side edge and an opposed second side edge, a front wheel assembly and a rear wheel assembly attached thereto;
   at least one pair of integral side panels for mounting on the opposed side edges of the chassis base to define a cargo space; and
   fastener apparatus comprising a stud mounted in a side edge of the chassis and a knob for engaging the stud for removably mounting the at least one pair of decorative side panels to the side edges of the chassis base,
   wherein the stud mounted in a side edge includes a lug section which protrudes from said side edge.

2. The wagon assembly of claim 1 wherein said stud has a threaded inner bore and said knob has an externally threaded stem for threadedly engaging said threaded bore.

3. The wagon assembly of claim 1 wherein the chassis base includes a tongue along each side edge and each of the integral side panels has a complementary groove formed therein.

4. The wagon assembly of claim 1 wherein said at least one pair of integral side panels is configured to have the ornamental appearance of a vehicle.

5. The wagon assembly of claim 4 wherein the vehicle is selected from a group of vehicles consisting of a bus, a boat, a taxicab, a locomotive engine, and a fire truck.

6. A wagon assembly comprising:
   a chassis having substantially rectangular flat base defined by a front edge, a rear edge, a first side edge and a second side edge, a top surface and a bottom surface with a material thickness there between, a front wheel assembly and a rear wheel assembly attached to the bottom surface of the base;
   a first decorative side panel on the first side edge of the chassis base and a second decorative side panel on the second side edge of the chassis base, and
   fastener apparatus at each end of each said decorative side panel for removably attaching the side panels to the chassis base, each said fastener apparatus comprising a mounting insert positioned in the side edge and a knob for threadedly engaging the mounting insert to impinge the side panel between the knob and the side edge.

7. The wagon assembly of claim 6 wherein the mounting insert has a lug at a first end and external threads at the second end, whereby the mounting insert threadedly engages a bore formed in the material thickness at the side edge of the chassis base and the lug protrudes outside the bore.

8. The wagon assembly of claim 7 wherein said side panels each have at least one mounting hole formed therein, said mounting hole positioned around said lug when the side panel is appropriately positioned on the wagon.

9. The wagon assembly of claim 6 further comprising a front panel attached to the front edge of the base and a rear panel attached to the rear edge of the base.

10. The wagon assembly of claim 9 wherein at least one of said front panel or rear panel has a handle apparatus.

11. The wagon assembly of claim 6 wherein said front wheel assembly is constructed for steering of the wagon assembly.

12. A wagon assembly comprising:
   a chassis including substantially rectangular flat base defined by a front edge, a rear edge, a first side edge and a second side edge, a steerable front wheel assembly and a rear wheel assembly attached to a bottom surface of the base;
   a front panel at the front edge and a rear panel at the rear edge;
   a first integral decorative side panel on the first side edge of the chassis base and a second integral decorative side panel on the second side edge of the chassis base, each said decorative side panels having at least a pair of mounting holes formed therein;
   a fastener apparatus at each end of each decorative side panel for removably attaching said side panels to the chassis base, each said fastener apparatus comprising a mounting insert having a body for insertion into the base side edge and a lug protruding beyond said side edge, each lug of each said mounting insert engaging a mounting hole in a decorative panel, and knob for threadedly engaging the mounting insert to impinge the side panel between the knob and the side edge.

13. The wagon assembly of claim 12 wherein one of said front panel or rear panel has a handhold.

14. The wagon assembly of claim 12 wherein the decorative side panels are configured to have the appearance of a vehicle selected from a group of vehicles consisting of a bus, a boat, a taxicab, a locomotive engine, and a fire truck.

15. The wagon assembly of claim 12 wherein the decorative side panels are configured to have the appearance of a living organism selected from the group consisting of warm-blooded animals, reptiles, fish and insects.

16. A wagon assembly for transporting a passenger such as a child, comprising:
   a chassis having substantially rectangular flat base defined by a front edge, a rear edge, a first side edge and a second side edge, a front wheel assembly and a rear wheel assembly attached to a bottom surface of the base;
   a first decorative side panel for on the first side edge of the chassis base and a second decorative side panel for on the second side edge of the chassis base, said decorative side panels and said flat base defining a passenger area; and fastener apparatus at each end of each said decorative side panel for removably attaching the side panels to the chassis base, each said fastener apparatus positioned out of reach of the passenger positioned at the passenger area and comprising a mounting insert positioned in the side edge and a knob for threadedly engaging the mounting insert to impinge the side panel between the knob and the side edge.

17. The wagon assembly of claim 16 wherein the first side edge of the base and the second side edge of the base each has a tongue formed thereon and the first decorative panel and the second decorative panel each have a groove formed therein, the respective tongues and grooves being in an engaged relationship.

18. A wagon assembly comprising:

a chassis having a base with a first side edge and a second side edge, a front wheel assembly and a rear wheel assembly attached thereto;

at least one pair of opposed decorative side panels for mounting on opposed side edges of the chassis base; and fastener apparatus for removably mounting the at least one pair of decorative side panels to the chassis base, said fastener apparatus comprising a stud and knob combination wherein said stud is mounted in one of said recited side edges and includes a lug section which protrudes from the side edge.

19. The wagon assembly of claim 18 wherein said stud has a threaded inner bore and said knob has an externally threaded stem for threadedly engaging said threaded bore.

* * * * *